United States Patent

[11] 3,543,767

[72] Inventor Homer Daniel Witzel
Zweibruecken, Germany
[21] Appl. No. 758,403
[22] Filed Sept. 9, 1968
[45] Patented Dec. 1, 1970
[73] Assignee Deere & Company
Moline, Illinois
a corporation of Delaware
[32] Priority Sept. 13, 1967
[33] Germany
[31] No. 1,657,331

[54] VARIABLE-SPEED COMBINE CYLINDER DRIVE
4 Claims, 1 Drawing Fig.
[52] U.S. Cl. ......................................................... 130/27
[51] Int. Cl. ....................................................... A01f 12/18
[50] Field of Search ............................................ 130/27.8,
27; 56/20, 21; 74/710, 740, 785

[56] References Cited
UNITED STATES PATENTS
| | | | |
|---|---|---|---|
| 3,090,253 | 5/1963 | Linsley et al. .................. | 74/710 |
| 3,306,302 | 2/1967 | Mark et al. ...................... | 130/27.8 |
| 3,375,738 | 4/1968 | Love ............................ | 130/27X |

Primary Examiner—A. F. Guida
Attorneys—H. Vincent Harsha, Harold M. Knoth, William A. Murray and John M. Nolan ABSTRACT: A combine cylinder drive has an input shaft driven through an infinitely variable belt drive. The combine cylinder is journaled on the input shaft and connected to the carrier element of a bevel epicyclic gear train having a selectively shiftable element for either locking the gear train to drive the cylinder at the same speed as the input shaft, or locking one of the bevel gears against rotation so that the cylinder is driven at a reduced speed relative to the input shaft.

Patented Dec. 1, 1970 3,543,767
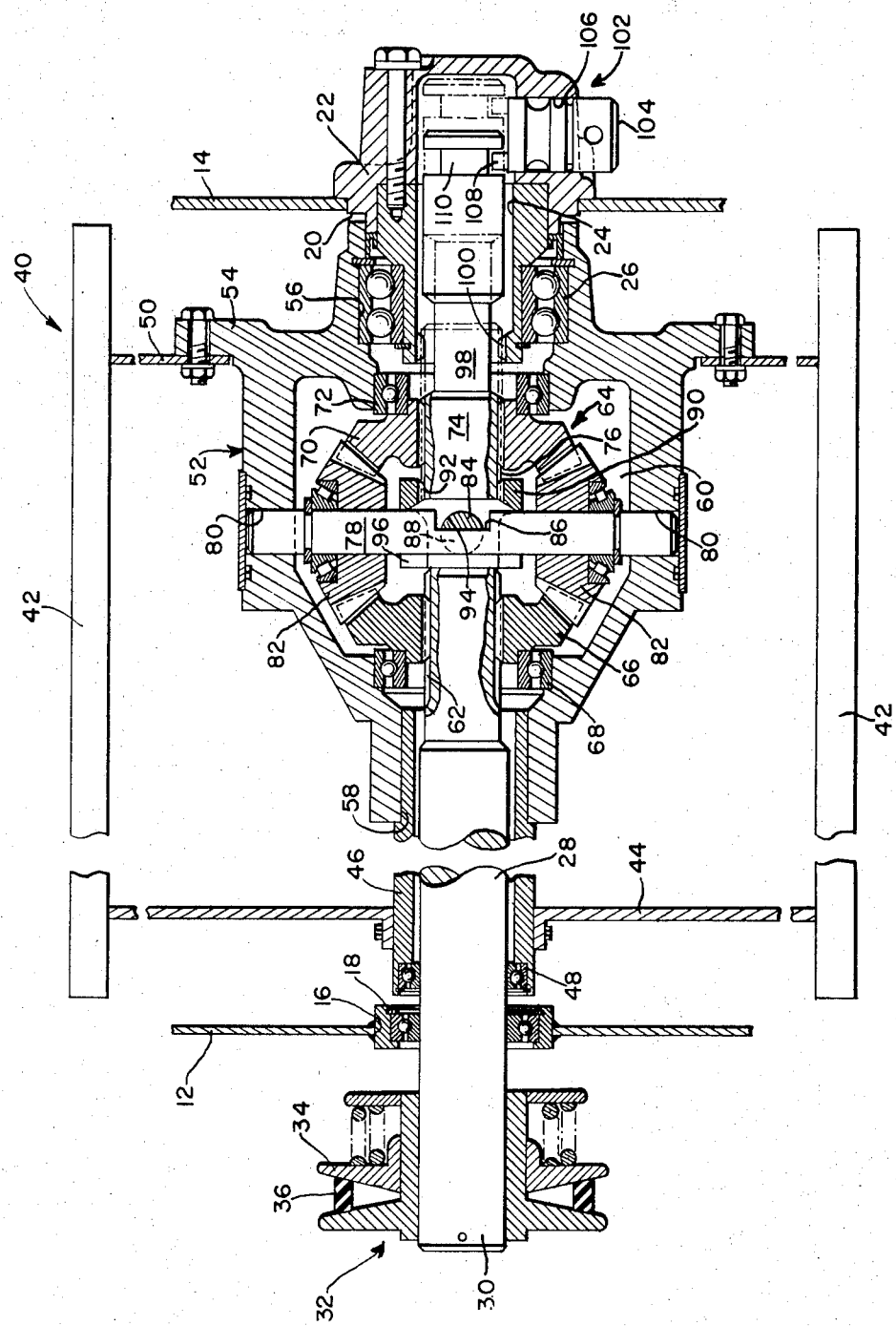

VARIABLE-SPEED COMBINE CYLINDER DRIVE

BACKGROUND OF THE INVENTION

This invention relates to an infinitely variable-speed, multirange drive for driving the threshing cylinder in a combine.

It is known to provide infinitely variable-speed drives to drive the threshing cylinders in combines to provide the optimum threshing cylinder speed for the particular crop being harvested, and it is also known to provide such a drive in the form of an infinitely variable belt drive combined with a change-speed gear-type drive to expand the range of the infinitely variable belt drive. Both multirange planetary and shiftable spur gear drives have been used to provide the multirange cylinder drives. However, heretofore the change-speed drives have been mounted on the combine exterior with the variable-speed input exteriorally of the change-speed drive. This arrangement, of course, requires the placement of the variable-speed belt drive a substantial distance from the side of the combine, increasing the width of the combine and increasing the complexity of the shielding for the belt drive.

SUMMARY OF THE INVENTION

According to the present invention, an improved, dual-range, infinitely variable-speed drive is provided for the threshing cylinder on a combine, the drive having a compact and efficient arrangement of components. More specifically, the drive utilizes a gear-type, dual-range drive, which provides the alternate speed ranges and is disposed in the interior of the combine body, within the threshing cylinder, so that the variable-speed belt drive can be located closely adjacent to the side of the combine. Another feature of the invention resides in the use of a bevel epicyclic gear train to provide the alternate speed ranges, the bevel gear train being sufficiently compact to fit within the threshing cylinder, while providing a durable and economical transmission.

BRIEF DESCRIPTION OF THE DRAWING

The single FIG. in the drawing is a fragmentary, somewhat schematic axial section through the threshing cylinder and its associated drive.

DESCRIPTION OF THE PREFERRED EMBODIMENT

The invention is embodied in a combine having a main separator body with opposite left and right upright sidewalls 12 and 14 respectively, only fragmentary portions of the sidewalls 12 and 14 being shown in the drawing. The left sidewall 12 has a circular opening 16 in which an antifriction bearing 18 is mounted, and the right sidewall 14 has a circular opening 20 coaxial with the opening 16. A generally cylindrical member 22 is formed by two rigidly connected parts and is rigidly mounted in the opening 20. The member 22 has an axial cylindrical bore 24 extending almost its entire length, the outer end of the member being closed, and an antifriction bearing 26 is coaxially mounted on the exterior of the member 22 on the interior side of the wall 14.

An input shaft 28 extends through the left sidewall 12 and is coaxially journaled in the bearing 18. The outer end 30 of the shaft 28 is exterior of the sidewall 12 and is driven by an infinitely variable belt drive, indicated generally by the numeral 32. The belt drive 32 is of conventional construction, and includes a variable-diameter driven sheave 34 mounted on the outer end 30 of the input shaft 28 and a drive belt 36, the remainder of the conventional belt drive components not being illustrated.

Mounted within the main separator body of the combine between the sidewalls 12 and 14 is a threshing cylinder 40, the threshing cylinder being somewhat schematically and fragmentarily illustrated in the drawings. The threshing cylinder includes a plurality of longitudinally extending threshing elements 42. One end of each threshing element 42 is supported at the periphery of the cylinder on a circular radial support member 44 coaxially mounted on a tubular hub 46 journaled on the input shaft 28 by means of an antifriction bearing 48. The other end of each threshing element 42 is supported on an annular radial support member 50 bolted to a radial flange 54 on an enlarged, hollow, annular member 52 having a cylindrical opening 56 at one end adapted to receive the bearing 26 and a cylindrical opening 58 at its other end, which tightly and rigidly receives the end of the tubular hub 46 so that the tubular hub 46 and the annular member 52 form an integral hub structure for the threshing cylinder rotatable on the bearings 56 and 48.

The annular member 52 has an enlarged hollow central portion, which forms a generally cylindrical chamber or housing 60, the right end of which is closed by the bearing 56 and the member 22 and the left end of which is enclosed by the input shaft, the bearing 48 and the tubular hub 46. The right-hand end of the input shaft 28 is provided with a splined surface 62, which extends into the closed chamber or housing 60.

Also disposed within the housing 60 is a bevel epicyclic gear train indicated generally by the numeral 64. The gear train 64 includes a bevel input gear 66 coaxially splined to the splined end 62 of the input shaft and rotatably supported relative to the member 52 by means of a bearing 68 mounted within the housing adjacent the opening 58 and coaxial therewith. The gear train 64 includes a second bevel gear 70, which is similar to the gear 66 and rotatably supported in the member 52 by means of a bearing 72, the bevel gears 66 and 70 being disposed in opposite ends of the housing 60 and facing one another. The bevel gear 70 is mounted on an axially shiftable shaft or clutch element 74, which is shiftable relative to the gear 70 and coaxial with the input shaft 28. The inner end of the shaft 74 is provided with a splined area 76 to which the bevel gear 70 is splined, the splined area 76 having a substantially greater axial length than the bevel gear 70.

Transversely disposed between the inner ends of the shafts 28 and 74 is a transverse shaft 78 intersecting the axis of the shafts 28 and 74 and having its opposite ends mounted in radial bores 80 in the opposite peripheral walls of the member 52. A pair of opposite bevel planet gears 82 are rotatably mounted on the shaft 78 and constantly mesh with the bevel gears 66 and 70, the member 52 functioning as the carrier element in the epicyclic gear train 64. A second transverse carrier shaft 84 extends radially across the housing 60 between the ends of the shafts 28 and 74 at right angles with the shaft 78 and carries a second set of planet gears (not shown) identical to the planet gears 82. The shaft 78 has a semicylindrical notch 86 which fits with a similar notch 88 in the shaft 84 at the intersection of the two carrier shafts 78 and 84 to permit the location of the carrier shafts in the same radial plane. The meshing notches 86 and 88, of course, prevent rotation of both the carrier shafts 78 and 84. Also disposed at the intersection of the shafts 78 and 84 and generally coaxially between the shafts 28 and 84 is a generally cylindrical clutch member 90, having an internally splined bore 92 at one end coaxial with and adapted to receive the end of the splined area 76 on the shaft 74. The member 90 is also provided with a transverse or diametrally extending bore 94 through which the shaft 84 extends and a diametral slot 96 at right angles to the bore 94 for receiving the shaft 78.

The shaft or clutch element 74 has a reduced diameter portion 98 adjacent the splined area 76 and the bore 24 in the cylindrical member 22, into which the shaft 74 extends, is provided with an internal spline 100 engageable with the splined area 76. The shaft or clutch element 74 is shiftable between alternate positions. In one position, which is shown in full lines in the drawing, the splined area 76 meshes with the splined opening 92 in the member 90 locking the gear 70 to the clutch member 90 and consequently to the carrier shafts 78 and 84, whereby the gear train 64 is locked up and all the components rotate in unison. In the other position of the shaft or clutch element 74, which is shown in dotted lines in the drawing, the splined area 76 is disengaged from the splined opening 92 but is in engagement with the spline 100 in the member 22, which in the first position of the clutch element is opposite the reduced diameter portion 98. In the second position of the clutch element, of course, the bevel gear 70 is locked to the member 22, which in turn is rigidly attached to the sidewall of the combine body, so that the bevel gear 70 is prevented from rotating.

The shaft or clutch element 74 is shifted between its alternate positions by a shift mechanism 102 on the exterior side of the sidewall 14, the shaft 74 extending through the sidewall. The shift mechanism 102 is illustrated as a simple mechanical mechanism, which includes a rotatable cam member 104 rotatably extending through a radial bore 106 in the member 22, which communicates with the axial bore 24. The rotatable cam member has an upwardly projecting cam tooth 108 receivable in an annular recess 110 at the outer end of the shaft 74, the cam tooth 108 being offset from the axis of rotation of the member 104 so that rotation of the member 104 causes axial shifting of the shaft 74. Thus, a 180° rotation of the member 104 shifts the shaft 74 between its alternate positions. Any suitable means could be provided for remotely rotating the member 104, and other means such as the hydraulically or electrically actuated device could be used to shift the clutch element between its alternate positions.

In operation, the variable-speed belt drive 32 provides infinitely variable speeds for the threshing cylinder 40 within a limited range. For higher speeds, a direct drive ratio can be provided wherein the threshing cylinder is driven at the same speed as the input shaft 28. This is achieved by shifting the shaft or clutch element 74 to the left or inwardly, as shown in full lines in the drawings, wherein the gear 70 and the clutch member 90 are splined to the same splined area 76, locking up the gear train 64 as previously described, so that the entire gear train, including the member 52 which functions as the carrier element, rotates with the input shaft 28. The member 52, of course, drives the threshing cylinder.

To drive the threshing cylinder at a reduced speed, the clutch element 74 is shifted to the right or outwardly to the dotted-line position shown in the drawing, wherein the splined area 76 is engaged by both the spline 100 and the gear 70 to lock the gear 70 to the combine body. The member 52, or carrier, is then driven at a reduced speed relative to the input gear 66 of the gear train, so that the threshing cylinder is driven at a reduced speed relative to the shaft 28. As is apparent, the dual-speed bevel epicyclic gear train is relatively compact, and fits easily within the combine cylinder.

I claim:

1. In a combine having a main separator body with opposite sidewalls and a threshing cylinder mounted therein, the improvement comprising: an input shaft coaxially journaled relative to the threshing cylinder and extending through one of the sidewalls; an infinitely variable-speed belt drive means operatively associated with the input shaft exteriorly of the body and operative to drive the input shaft at infinitely variable speeds within a limited range; a bevel epicyclic gear train disposed within the threshing cylinder between the opposite body sidewalls and including first and second opposite bevel gear elements coaxially disposed relative to the input shaft, a carrier element journaled relative to the first and second bevel gear elements and drivingly connected to the threshing cylinder, and a bevel planet gear element rotatably carried by the carrier element and constantly meshing with the first and second bevel gear elements; means drivingly connecting the first bevel gear element to the input shaft; a clutch means shiftable between a first position wherein it connects two of the epicyclic gear train elements for rotation of the gear train elements in unison and a second position wherein it connects the second bevel gear element to the main separator body to establish a reduced drive ratio in the gear train; and means exteriorly of the body for selectively shifting the clutch means between its alternate positions.

2. The invention defined in claim 1 wherein the clutch means includes an axially shiftable shaft coaxial with the threshing cylinder and the input shaft, coaxially supporting the second bevel gear element, and shiftable between a first position wherein it connects the second bevel gear element to the carrier element and a second position wherein it locks the second bevel gear element to the body.

3. In a combine having a main separator body with opposite sidewalls and a threshing cylinder mounted therein, the improvement comprising: an input shaft journaled in one of the sidewalls and coaxially rotatable relative to the threshing cylinder; an infinitely variable-speed belt drive means operatively associated with the input shaft exteriorly of the body and operative to drive the input shaft at infinitely variable speeds within a limited range; an epicyclic gear train coaxially mounted within the threshing cylinder and having first, second and third coaxial relatively rotatable elements and planet gear means carried by one element and constantly meshing with the other two elements, the input shaft being drivingly connected to the first element, and the threshing cylinder being connected to and driven by the third of said elements; a clutch means shiftable between a first position wherein it connects two of the epicyclic gear train elements for rotation of the elements in unison and a second position wherein it locks the second element to the body to establish a reduction drive ratio through the epicyclic gear train; and means for selectively shifting the clutch means between its alternate positions.

4. The invention defined in claim 3 wherein the first and second epicyclic gear train elements are opposite bevel gears and the planet gear means are bevel gears carried by the third element in constant mesh with the first and second gear train elements.